US012542376B2

(12) United States Patent
Li et al.

(10) Patent No.: US 12,542,376 B2
(45) Date of Patent: Feb. 3, 2026

(54) RADIATOR ASSEMBLY

(71) Applicant: Outdoor Wireless Networks LLC, Claremont, NC (US)

(72) Inventors: YueMin Li, Suzhou (CN); Bo Wu, Suzhou (CN); Bin Sun, Suzhou (CN); Jian Zhang, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 266 days.

(21) Appl. No.: 18/351,526

(22) Filed: Jul. 13, 2023

(65) Prior Publication Data

US 2023/0361486 A1 Nov. 9, 2023

Related U.S. Application Data

(63) Continuation of application No. 17/462,555, filed on Aug. 31, 2021, now Pat. No. 11,742,596.

(30) Foreign Application Priority Data

Sep. 8, 2020 (CN) ......................... 202010931976.6

(51) Int. Cl.

| | |
|---|---|
| ***H01Q 21/26*** | (2006.01) |
| ***H01Q 1/24*** | (2006.01) |
| ***H01Q 21/00*** | (2006.01) |
| *H01Q 9/26* | (2006.01) |
| *H01Q 21/06* | (2006.01) |

(52) U.S. Cl.

CPC ............. *H01Q 21/26* (2013.01); *H01Q 1/246* (2013.01); *H01Q 21/0006* (2013.01); *H01Q 9/26* (2013.01); *H01Q 21/062* (2013.01)

(58) Field of Classification Search

CPC .... H01Q 21/26; H01Q 1/246; H01Q 21/0006; H01Q 21/062; H01Q 9/06

See application file for complete search history.

(56) References Cited

U.S. PATENT DOCUMENTS

| | | | | |
|---|---|---|---|---|
| 2018/0294550 | A1 | 10/2018 | Segador Alvarez et al. | |
| 2020/0185838 | A1 | 6/2020 | Li et al. | |
| 2021/0305718 | A1* | 9/2021 | Li ............................ | H01Q 5/48 |
| 2022/0077600 | A1 | 3/2022 | Sundararajan et al. | |

FOREIGN PATENT DOCUMENTS

| | | |
|---|---|---|
| CN | 201199545 Y | 2/2009 |
| CN | 111193099 A | 5/2020 |

OTHER PUBLICATIONS

"Extended European Search Report for European Application No. 21195370.8, dated Jan. 21, 2022, 8 pages".

* cited by examiner

*Primary Examiner* — Joseph J Lauture

(74) *Attorney, Agent, or Firm* — Myers Bigel, P.A.

(57) ABSTRACT

A radiator assembly for a base station antenna has a longitudinal central axis and two dipoles cross-arranged around the longitudinal central axis. Each dipole has two dipole arms and each dipole arm is equipped with a hook-like feeder made of a metal sheet and having a free end portion. The hook-like feeder is capacitively coupled with an associated dipole arm. The radiator assembly is compact and is easy to manufacture and assemble.

20 Claims, 6 Drawing Sheets

RADIATOR ASSEMBLY

CROSS-REFERENCE TO RELATED APPLICATION

The present application is a continuation of U.S. patent application Ser. No. 17/462,555, filed on Aug. 31, 2021, which claims to Chinese Patent Application No. 202010931976.6, filed Sep. 8, 2020, the entire contents of which are incorporated herein by reference as if set forth fully herein.

FIELD

The disclosure relates to the communication field, and in particular relates to a radiator assembly for a base station antenna.

BACKGROUND

A large number of base stations are involved in a mobile communication network, various base stations may comprise base station antennas, and the base station antennas are used to receive and/or transmit radio frequency signals. A base station antenna may comprise a plurality of radiator assemblies, which may also be referred to as radiating elements or antenna elements. The miniaturization of the sizes of radiator assemblies is desirable.

SUMMARY

An object of the disclosure is to provide a compact radiator assembly for a base station antenna.

The object is achieved by a radiator assembly for a base station antenna, the radiator assembly has one longitudinal central axis and two dipoles cross-arranged around the longitudinal central axis, and each dipole has two dipole arms, wherein each dipole arm is equipped with a hook-like feeder made of a metal sheet and having a free end portion, and the hook-like feeder is capacitively coupled with an associated dipole arm.

In some embodiments, each dipole arm may be made of a metal sheet, and the dipole arm may comprise a feeder stem extending longitudinally and a radiating portion extending transversely by reference to the longitudinal central axis.

In some embodiments, the radiator assembly may comprise a feeder stem consisting of a printed circuit board (PCB), and the dipole arms may be formed on another common PCB.

In some embodiments, each hook-like feeder may be mounted radially inside or outside the feeder stem by reference to the longitudinal central axis.

In some embodiments, a pair of hook-like feeders placed opposite to each other may be mounted radially inside or outside the feeder stem by reference to the longitudinal central axis.

In some embodiments, the hook-like feeders may be mounted radially inside the feeder stems by reference to the longitudinal central axis.

In some embodiments, the hook-like feeders may be mounted radially outside the feeder stems by reference to the longitudinal central axis.

In some embodiments, a first pair of hook-like feeders placed opposite to each other may be mounted radially inside the feeder stems and a second pair of hook-like feeders placed opposite to each other may be mounted radially outside the feeder stems by reference to the longitudinal central axis.

In some embodiments, each hook-like feeder may comprise a first leg, a second leg and a connecting segment connecting the first leg and the second leg, the first leg may be configured to be electrically connected to a feeder panel through an end portion of the first leg, and the second leg may have the free end portion.

In some embodiments, the first leg and the second leg may extend longitudinally by reference to the longitudinal central axis, the first leg may be located in the area of the feeder stem of the dipole arm adjacent to the associated dipole arm, the second leg may be located in the area of the feeder stem of the associated dipole arm in the circumferential direction of the radiator assembly, and the connecting segment may cross the feeder stem of the adjacent dipole arm and the feeder stem of the associated dipole arm.

In some embodiments, each feeder stem may be planar.

In some embodiments, each feeder stem may be bent.

In some embodiments, each hook-like feeder may be planar.

In some embodiments, each hook-like feeder may be bent.

In some embodiments, the first leg may be parallel to the feeder stem of the adjacent dipole arm, the second leg may be parallel to the feeder stem of the associated dipole arm, and the connecting segment may be bent.

In some embodiments, the first leg and the second leg may form a right angle.

In some embodiments, each feeder stem may be configured to be bent and may comprise a plurality of planar sections extending longitudinally, and each hook-like feeder may be configured to be planar, wherein the first leg may be parallel to one planar section of the feeder stem of the adjacent dipole arm, and the second leg may be parallel to one planar section of the feeder stem of the associated dipole arm.

In some embodiments, each feeder stem may be C-shaped and each feeder stem may comprise three side-by-side planar sections extending longitudinally in the cross-section perpendicular to the longitudinal central axis.

In some embodiments, the radiator assembly may comprise a common radiator support, the radiator support is configured to be mounted on a panel assembly having a reflecting panel and a feeder panel, and the dipole arms may be mounted on the common radiator support.

In some embodiments, the hook-like feeders mounted radially outside the feeder stems may be mounted on the common radiator support.

In some embodiments, the radiator assembly may comprise a central support, and the central support may be mounted at the center of the common radiator support.

In some embodiments, the hook-like feeders mounted radially inside the feeder stems may be mounted on the central support.

In some embodiments, the central support may have a top component.

In some embodiments, the top component may go beyond the radiating portions of the dipole arms by reference to the longitudinal central axis.

In some embodiments, the central support may have a top component, a columnar body and a bottom component, and the top component and the bottom component may be connected to the body.

In some embodiments, the top component may have at least a claw element, for example, a plurality of claw elements, configured to hold hook-like feeders.

In some embodiments, the bottom component may have at least a claw element, for example, a plurality of claw elements, configured to hold hook-like feeders.

In some embodiments, the top component may have at least a snap hook configured to detachably and longitudinally fix hook-like feeders.

In some embodiments, the bottom component may have at least a snap hook configured to detachably and longitudinally fix hook-like feeders.

According to another aspect of the disclosure, a radiator assembly for a base station antenna is proposed, the radiator assembly comprising first through fourth dipole arms arranged to define a cross shape, where each dipole arm includes a longitudinally-extending feeder stem and a transversely-extending radiating portion, first through fourth hook-like feeders, wherein at least some of the feeder stems or at least some of the hook-like feeders include at least two longitudinally-extending bends.

In some embodiments, each hook-like feeder may include the at least two longitudinally-extending bends, and at least first and second of the hook-like feeders may be positioned outside a rectangle defined by the feeder stems when viewed in plan view.

In some embodiments, third and fourth of the hook-like feeders may be positioned inside the rectangle defined by the feeder stems when viewed in plan view.

In some embodiments, each feeder stem may include the at least two longitudinally-extending bends, and each hook-like feeder may be positioned radially outside a respective one of the feeder stems.

In some embodiments, each longitudinally-extending bend may define a 45 degree angle.

The technical characteristics mentioned above, the technical characteristics to be mentioned below, and the technical characteristics which may be obtained from the drawings may be combined arbitrarily as long as these technical characteristics do not conflict with each other. All technically feasible characteristic combinations are technical contents stated in the disclosure.

DETAILED DESCRIPTION

Figure 1:
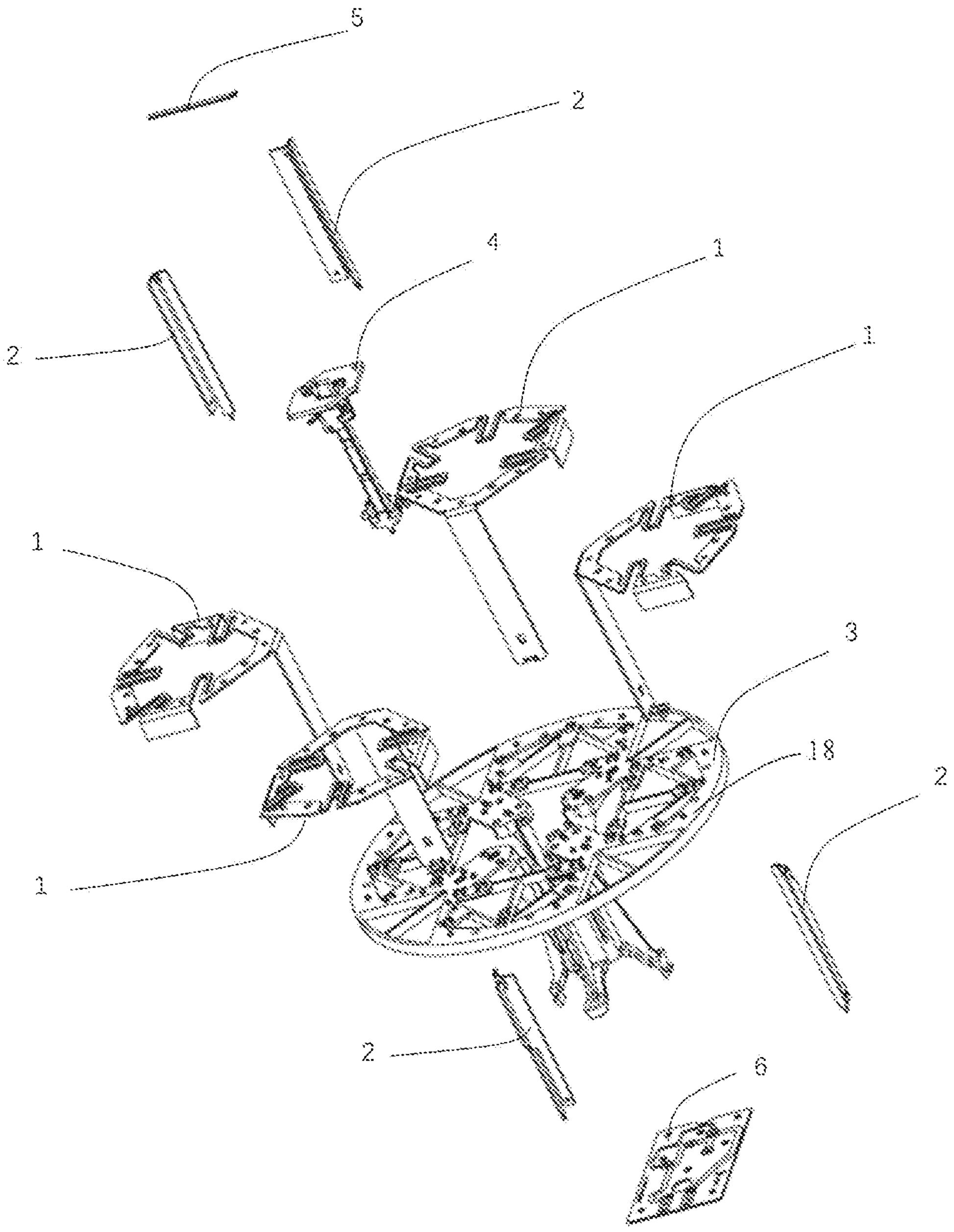
FIG. 1 is an exploded view of the radiator assembly in a first embodiment of the present invention.
Figure 2:
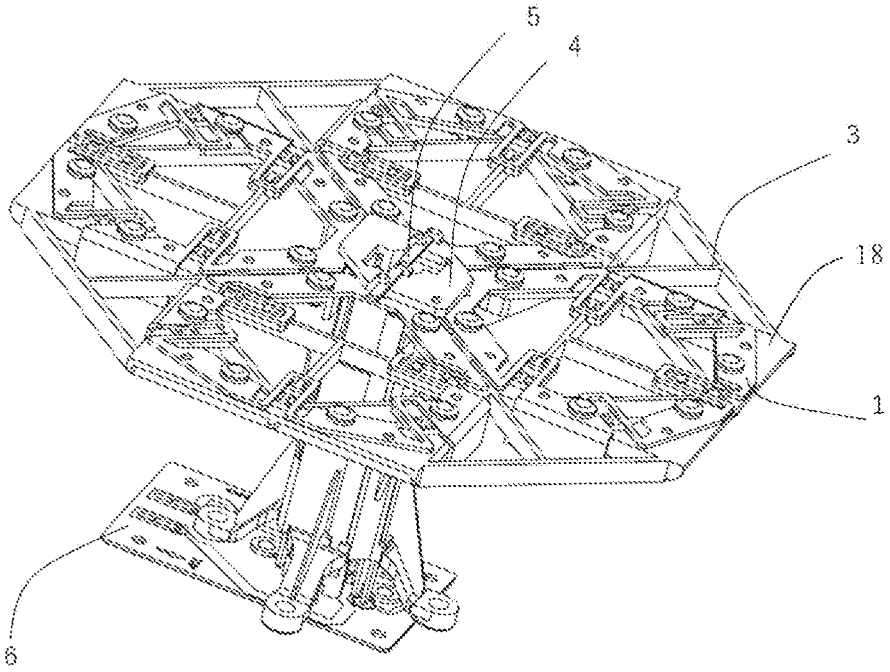
FIG. 2 is a perspective view of the radiator assembly in an assembled state in a second embodiment of the present invention.

The general structure of the radiator assembly for a base station antenna in some embodiments of the present invention is described below with reference to FIGS. 1 and 2, wherein FIG. 1 is an exploded view of the radiator assembly in a first embodiment, and FIG. 2 is a perspective view of the radiator assembly in the assembled state in a second embodiment of the present invention. The first and second embodiments mainly differ in the outline of a support table 18 of the radiator support. The first and second embodiments may be the same in other aspects.

The radiator assembly may have a longitudinal central axis (not shown in the drawings) and two dipoles cross-arranged around the longitudinal central axis. Each dipole may have two dipole arms 1. Each dipole arm 1 may be made of metal, and may be separate from the other dipole arms. Alternatively, the dipole arms 1 may be formed on a common PCB. Each dipole arm 1 may comprise a single piece or may comprise multiple pieces.

Each dipole arm 1 may be equipped with a hook-like feeder 2 made of a metal sheet. Through one end, the hook-like feeder 2 may be electrically connected to the feeder panel (e.g., a printed circuit board feeder panel) of a panel assembly 6 only locally described in FIGS. 1 and 2, and has a free end portion and is capacitively coupled with an associated dipole arm 1. The panel assembly may further comprise a reflecting panel. The hook-like feeder may be, for example, galvanically connected to the conductive traces of the feeder panel, and may be capacitively coupled with an associated dipole arm so that radio frequency signals can be transmitted between the feeder panel and the dipole arm via the hook-like feeder.

The radiator assembly may comprise a common radiator support 3. The radiator support may be mounted to extend forwardly from the panel assembly, and the dipole arms 1 may be mounted on the common radiator support 3.

The radiator assembly may comprise a central support 4 that is mounted at the center of the radiator support 3. The radiator support 3 may have a central recess 20 for accommodating the central support 4. The central support 4 may have a top component 21 (see FIG. 6A). A parasitic element 5 may be mounted on the top component 21, and the parasitic element 5 is configured to adapt to the electrical properties of the radiator assembly.

Figure 3:
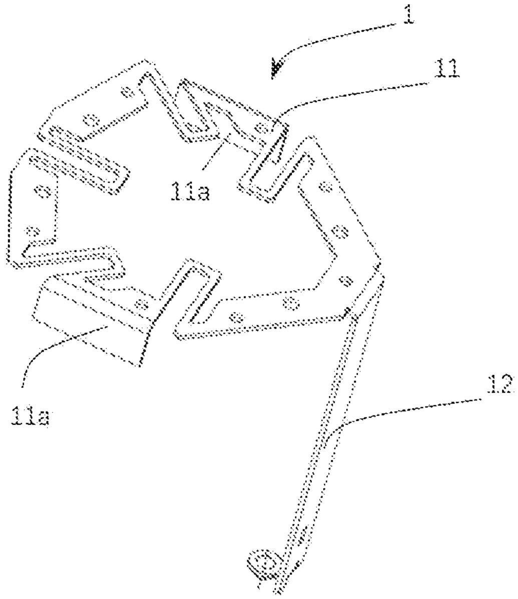
FIG. 3 is a perspective view of an embodiment of a dipole arm.

FIG. 3 is a perspective view of an embodiment of the dipole arm 1. The dipole arm may be made of a metal, for example, formed by stamping a metal sheet. The dipole arm 1 may comprise a radiating portion 11 and a feeder stem 12. By reference to the longitudinal central axis of the radiator assembly, the feeder stem 12 may extend longitudinally, for example, parallel to the longitudinal central axis, and the radiating portion 11 may extend on a transverse plane transverse to the longitudinal central axis. The radiating portion 11 may have at least a lappet 11*a* bent from the transverse plane to increase the bandwidth of the radiator assembly. Two exemplary lappets 11*a* can be seen in FIG. 3.

Figure 4:
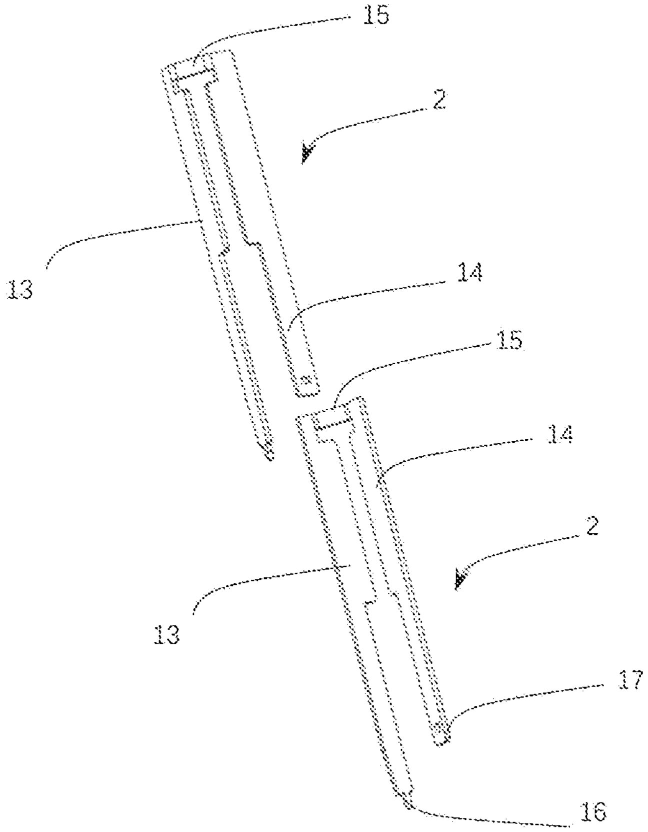
FIG. 4 is a perspective view of a pair of hook-like feeders.

FIG. 4 is a perspective view of an embodiment of a pair of hook-like feeders 2. The pair of hook-like feeders 2 may respectively match a dipole arm 1. Each hook-like feeder 2 may be made of a metal, for example, formed by stamping a metal sheet. Each hook-like feeder 2 may comprise a first leg 13, a second leg 14, and a connecting segment 15 connecting the first leg 13 and the second leg 14. The first leg 13 may be electrically connected to the feeder panel of the panel assembly 6 through an end portion 16 of the first leg 13. The second leg 14 may have a free end portion 17. Each hook-like feeder 2 may be configured to be capacitively coupled to the associated dipole arm 1 to transmit radio frequency signals. Each hook-like feeder 2 may be mounted radially inside or outside the feeder stem 12.

Figure 8A:
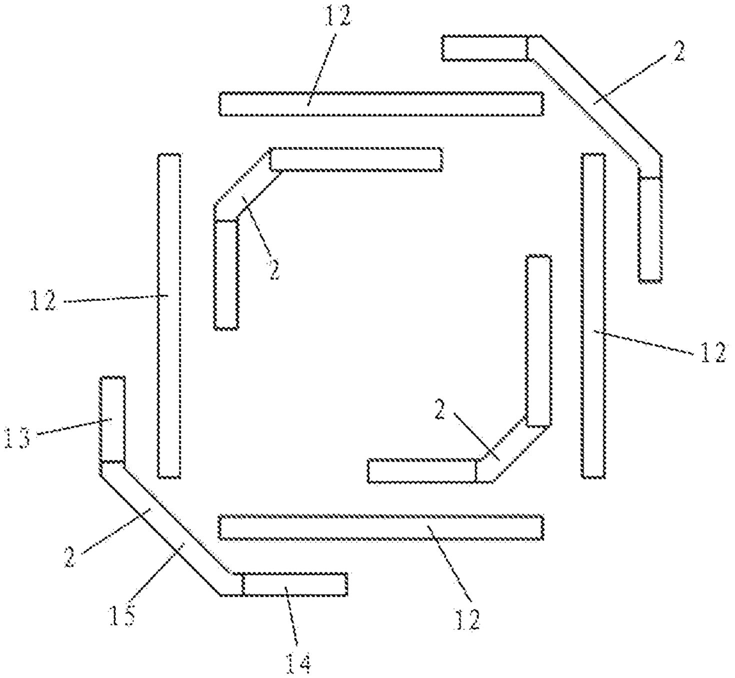
FIGS. 8A and 8B are schematic views of two different structures and layouts of hook-like feeders and feeder stems.
Figure 8B:
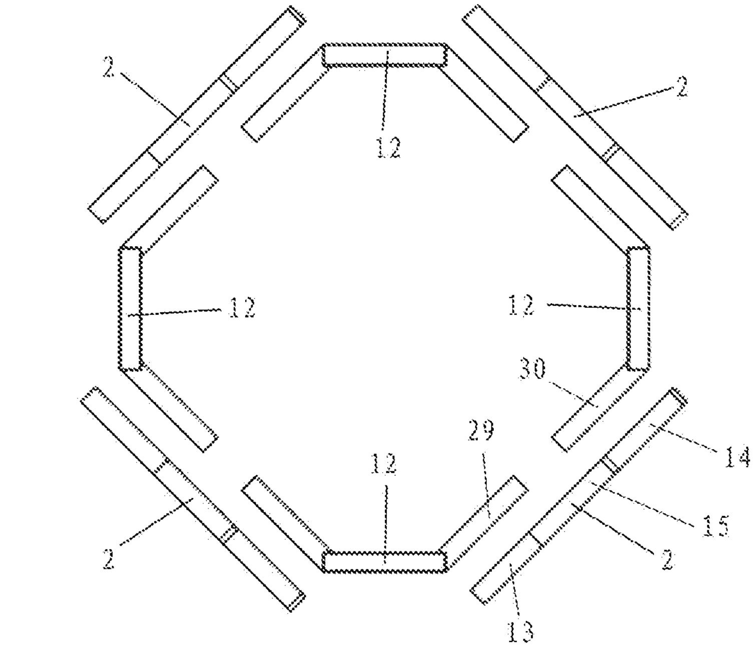

FIGS. 8A and 8B are schematic views of two different structures and layouts of the hook-like feeders 2 and the feeder stems 12 which are viewed from the top along the longitudinal central axis of the radiator assembly, and the two figures describe the sections of the feeder stems 12 and the projections of the hook-like feeders 2 along the longitudinal central axis of the radiator assembly.

As shown in FIG. 8A, each feeder stem 12 may be planar, and each hook-like feeder 2 may be bent. A first pair of hook-like feeders 2 positioned opposite to each other may be mounted radially inside the feeder stems 12, and a second pair of hook-like feeders 2 positioned opposite to each other may be mounted radially outside the feeder stems 12. By reference to the longitudinal central axis of the radiator assembly, the first leg 13 and the second leg 14 may extend longitudinally. In the circumferential direction of the radiator assembly, the first leg 13 may be located in the area of the feeder stem of the dipole arm adjacent to the associated dipole arm, the second leg 14 may be located in the area of the feeder stem of the associated dipole arm, and the connecting segment 15 may cross the feeder stem of the adjacent dipole arm and the feeder stem of the associated dipole arm.

As shown in FIG. 8B, each feeder stem 12 may be bent, and each hook-like feeder may be planar. In a cross-section perpendicular to the longitudinal central axis, each feeder stem 12 may be C-shaped and each feeder stem 12 may comprise three planar sections extending longitudinally, and each hook-like feeder 2 may be configured to be planar, wherein the first leg 13 may be parallel to one planar section 29 of the feeder stem 12 of the adjacent dipole arm 1, and the second leg 14 may be parallel to one planar section 30 of the feeder stem 12 of the associated dipole arm 1, and the connecting segment 15 may cross the feeder stem of the adjacent dipole arm and the feeder stem of the associated dipole arm. The hook-like feeders 2 may be mounted radially outside the feeder stems 12. In addition, it is possible that the hook-like feeders 2 may be mounted radially inside the feeder stems 12.

Figure 5A:
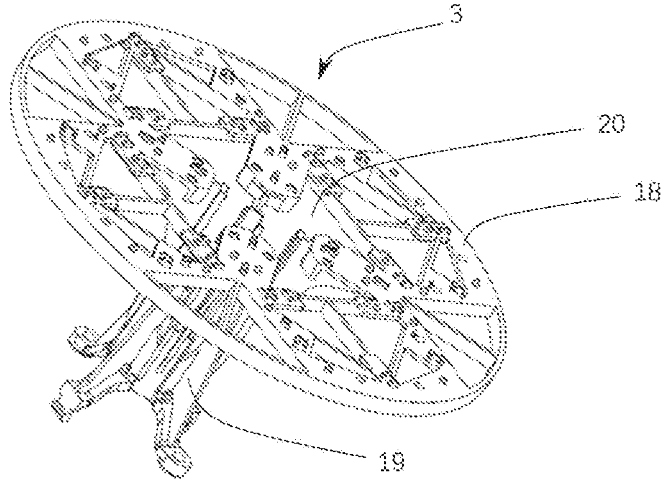
FIGS. 5A and 5B are perspective views of the radiator support at different angles of view.
Figure 5B:
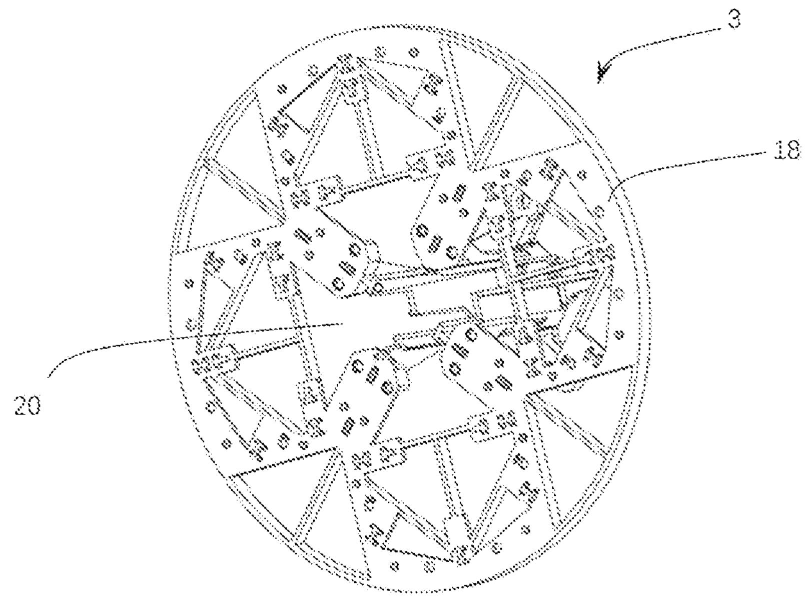

FIGS. 5A and 5B are perspective views of the radiator support 3 at different angles of view. The radiator support 3 may have a support table 18 and a strut 19. The radiator support 3 may have a central recess 20 for accommodating the central support 4 which will be described in detail later. The radiating portions 11 of the dipole arms 1 may be supported and fixed on the support table 18 of the radiator support 3. The strut 19 may be fixed on the panel assembly 6 with a plurality of fasteners (not shown in the drawings). The hook-like feeders 2 mounted radially outside the feeder stems 12 may be directly mounted on the radiator support 3.

Figure 6A:
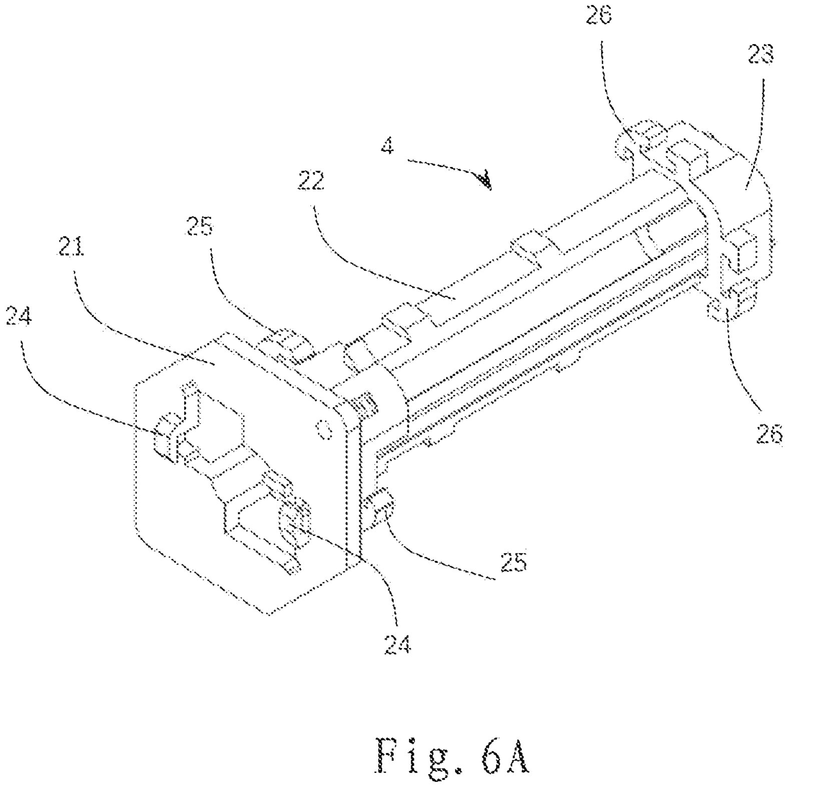
FIGS. 6A and 6B are perspective views of the central support at different angles of view.
Figure 6B:
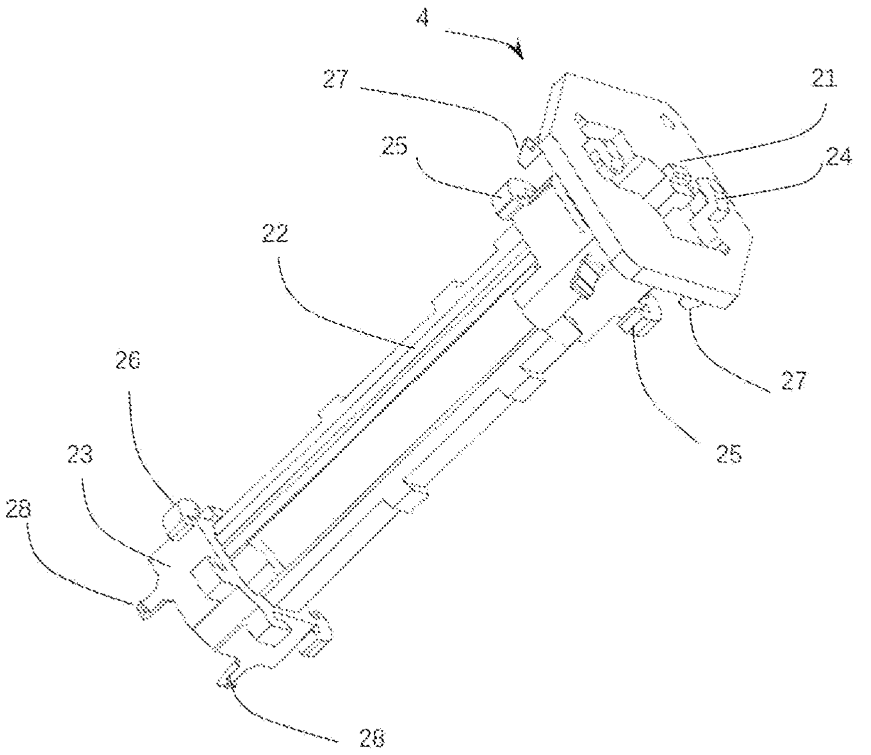

FIGS. 6A and 6B are perspective views of the central support 4 at different angles of view. The central support 4 may have a top component 21, a columnar body 22 and a bottom component 23, and the top component and the bottom component are connected to the body. The top component 21 may have a plurality of claws 24 on the top surface and the claws may be configured to fix the parasitic element 5. The top component 21 may have one or more claws 25 on its lower side. The bottom component 23 may have one or more claws 26. The claws 25 and the claws 26 may be configured to fix the hook-like feeders 2 mounted radially inside the feeder stems 12. For each hook-like feeder 2 mounted radially inside the feeder stem, the central support 4 may have at least three corresponding claws 25, 26, for example, two claws 25 and two claws 26. The central support 4 may have snap hooks configured to detachably and longitudinally fix the central support 4. For example, the top component and the bottom component may have a plurality of snap hooks 27, 28, respectively.

Figure 7:
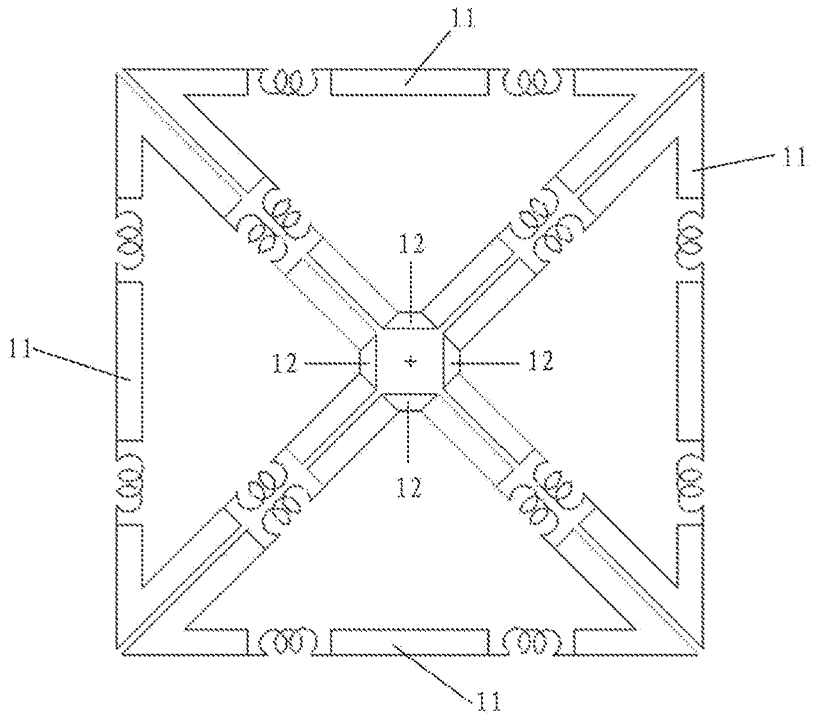
FIG. 7 is an outline view of the dipole arms of the radiator assembly in a third embodiment of the present invention.

FIG. 7 is an outline view of the dipole arms of the radiator assembly in a third embodiment of the present invention. Only the plan view of the dipole arms 1 is described in FIG. 7. Each radiating portion 11 may be configured to be roughly triangular and the four radiating portions 11 may form an outline of a rough square in whole. The inductors that are shown on the dipole arms may be implemented as narrow meandered metal sections (e.g., U-shaped metal sections) that connect wide metal segments of the dipole arms.

It will be understood that, the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprise" and "include" (and variants thereof), when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

The thicknesses of elements in the drawings may be exaggerated for the sake of clarity. Further, it will be understood that when an element is referred to as being "on," "coupled to" or "connected to" another element, the element may be formed directly on, coupled to or connected to the other element, or there may be one or more intervening elements therebetween. In contrast, terms such as "directly on," "directly coupled to" and "directly connected to," when used herein, indicate that no intervening elements are present. Other words used to describe the relationship between elements should be interpreted in a like fashion (i.e., "between" versus "directly between", "attached" versus "directly attached," "adjacent" versus "directly adjacent", etc.).

Terms such as "top," "bottom," "upper," "lower," "above," "below," and the like are used herein to describe the relationship of one element, layer or region to another element, layer or region as illustrated in the figures. It will be understood that these terms are intended to encompass different orientations of the device in addition to the orientation depicted in the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

It will also be appreciated that all example embodiments disclosed herein can be combined in any way.

Finally, it is to be noted that, the above-described embodiments are merely for understanding the present invention but not constitute a limit on the protection scope of the present invention. For those skilled in the art, modifications may be made on the basis of the above-described embodiments, and these modifications do not depart from the protection scope of the present invention.

The invention claimed is:

1. A radiator assembly for a base station antenna, comprising:

first through fourth dipole arms, where each dipole arm includes a feeder stem and a radiating portion; and a plurality of feeders, wherein at least one of the feeders is positioned outside a polygon defined by the feeder stems when the radiator assembly is viewed in plan view.

2. The radiator assembly for a base station antenna of claim 1, wherein each feeder is a hook-like feeder.

3. The radiator assembly for a base station antenna of claim 1, wherein the plurality of feeders consists of first through fourth feeders.

4. The radiator assembly for a base station antenna of claim 3, wherein all of the feeders are positioned outside the polygon defined by the feeder stems when the radiator assembly is viewed in plan view.

5. The radiator assembly for a base station antenna of claim 3, wherein a total of two of the first through fourth feeders are positioned outside the polygon defined by the feeder stems when the radiator assembly is viewed in plan view and a remaining two of the first through fourth feeders are positioned inside the polygon defined by the feeder stems when the radiator assembly is viewed in plan view.

6. The radiator assembly for a base station antenna of claim 1, wherein each feeder stem includes first and second longitudinally-extending bends.

7. The radiator assembly for a base station antenna of claim 1, wherein each longitudinally-extending bend defines a 45° angle.

8. A radiator assembly for a base station antenna, comprising:

first through fourth dipole arms, where each dipole arm includes a feeder stem and a radiating portion, the radiating portions extending outwardly from a central region; and a first feeder that extends adjacent and radially inward of the feeder stem of the first dipole arm; and a second feeder that extends adjacent and radially outward of the feeder stem of the third dipole arm.

9. The radiator assembly for a base station antenna of claim 8, wherein the first and second dipole arms form a first dipole, and the third and fourth dipole arms form a second dipole.

10. The radiator assembly for a base station antenna of claim 9, further comprising:

a third feeder that extends adjacent and radially inward of the feeder stem of the second dipole arm; and a fourth feeder that extends adjacent and radially outward of the feeder stem of the fourth dipole arm.

11. The radiator assembly for a base station antenna of claim 8, wherein the first feeder is a hook-shaped feeder that includes first and second longitudinally-extending bends.

12. The radiator assembly for a base station antenna of claim 11, wherein the second feeder is a hook-shaped feeder that includes first and second longitudinally-extending bends.

13. The radiator assembly for a base station antenna of claim 8, wherein the feeder stems of the first through fourth dipole arms define a rectangle when the radiator assembly is viewed in plan view.

14. The radiator assembly for a base station antenna of claim 8, wherein the first feeder is positioned inside a polygon defined by the feeder stems when the radiator assembly is viewed in plan view and the second feeder is positioned outside the polygon defined by the feeder stems when the radiator assembly is viewed in plan view.

15. A radiator assembly for a base station antenna, comprising:

first through fourth dipole arms, where each dipole arm includes a longitudinally-extending feeder stem and a transversely-extending radiating portion; and a plurality of hook-like feeders, wherein the feeder stem of at least one of the first through fourth dipole arms includes at least two longitudinally-extending bends.

16. The radiator assembly for a base station antenna of claim 15, wherein the feeder stems of all of the first through fourth dipole arms each includes at least two longitudinally-extending bends.

17. The radiator assembly for a base station antenna of claim 15, wherein each feeder stem is a C-shaped feeder stem.

18. The radiator assembly for a base station antenna of claim 15, wherein the plurality of hook-like feeders comprises first through fourth hook-like feeders, and each of the first through fourth hook-like feeders is planar.

19. The radiator assembly for a base station antenna of claim 15, wherein the plurality of hook-like feeders comprises first through fourth hook-like feeders, and each of the first through fourth hook-like feeders is radially outside a respective one of the feeder stems.

20. The radiator assembly for a base station antenna of claim 15, wherein the radiating portion of each of the first through fourth dipole arms is triangular.

* * * * *